US012770018B2

(12) United States Patent
Tandia et al.

(10) Patent No.: US 12,770,018 B2
(45) Date of Patent: Oct. 20, 2026

(54) COLLABORATIVE MULTITASK AND TRANSFER LEARNING FOR PREDICTING PROPERTIES WITH SCARCE DATA

(71) Applicant: CORNING INCORPORATED, Corning, NY (US)

(72) Inventors: Adama Tandia, Corning, NY (US); Zheren Wang, Redwood City, CA (US)

(73) Assignee: CORNING INCORPORATED, Corning, NY (US)

( * ) Notice: Subject to any disclaimer, the term of this patent is extended or adjusted under 35 U.S.C. 154(b) by 476 days.

(21) Appl. No.: 18/420,906

(22) Filed: Jan. 24, 2024

(65) Prior Publication Data

US 2024/0265267 A1 Aug. 8, 2024

Related U.S. Application Data

(60) Provisional application No. 63/443,166, filed on Feb. 3, 2023.

(51) Int. Cl.

*G06N 3/09* (2023.01)
*G06N 3/0455* (2023.01)
*G06N 3/096* (2023.01)

(52) U.S. Cl.

CPC ........... *G06N 3/096* (2023.01); *G06N 3/0455* (2023.01)

(58) Field of Classification Search

CPC ...... G06N 3/096; G06N 3/0455; G06N 3/045; G06N 3/08

See application file for complete search history.

(56) References Cited

U.S. PATENT DOCUMENTS

| | | | |
|---|---|---|---|
| 9,449,284 B2 | 9/2016 | Niculescu-Mizil et al. | |
| 2019/0244108 A1* | 8/2019 | Meyerson | G06N 3/044 |
| 2019/0347526 A1* | 11/2019 | Sunkavalli | G06F 18/2163 |

(Continued)

FOREIGN PATENT DOCUMENTS

| | | |
|---|---|---|
| CN | 106295697 A | 1/2017 |
| CN | 109299487 A | 2/2019 |

(Continued)

OTHER PUBLICATIONS

Wang, "Compositionally restricted attention-based network for materials property predictions", Computational Materials, 2021. (Year: 2021).*

(Continued)

*Primary Examiner* — Dave Misir
(74) *Attorney, Agent, or Firm* — Kevin M. Able

(57) ABSTRACT

A method of forming a model for predicting one or more properties is provided. The method includes determining a plurality of datasets of properties. The method also includes training a common encoder and one or more individual decoders utilizing the plurality of datasets of properties. Each individual decoder of the individual decoder(s) is distinct from each other and is used to model different properties. The method also includes determining a transfer learning dataset for one or more properties, training a new decoder using the transfer learning dataset and the common encoder, generating a predicted property using the common encoder and the new decoder, and preparing an item using the predicted property.

20 Claims, 9 Drawing Sheets

(56) References Cited

U.S. PATENT DOCUMENTS

| | | | | |
|---|---|---|---|---|
| 2020/0082534 | A1* | 3/2020 | Nikolov | A61B 5/7267 |
| 2021/0232919 | A1* | 7/2021 | Cheng | G06N 3/08 |
| 2023/0170059 | A1* | 6/2023 | Gadhiya | C08J 11/16<br>702/27 |
| 2024/0338572 | A1* | 10/2024 | Gillian | G06N 3/0895 |

FOREIGN PATENT DOCUMENTS

| | | | |
|---|---|---|---|
| IN | 202041022535 | A | 6/2020 |
| WO | 2022/157205 | A1 | 7/2022 |

OTHER PUBLICATIONS

Yamada, "Predicting Materials Properties with Little Data Using Shotgun Transfer Learning", ACS Central Science, 2019. (Year: 2019).*

Chen et al; "A Simple Framework for Contrastive Learning of Visual Representations"; arXiv:2002.05709; 20 pages.

Cubuk et al; "Screening billions of candidates for solid lithium-ion conductors: A transfer learning approach for small data"; J. Chem. Phys. 150, 214701 (2019).

* cited by examiner

COLLABORATIVE MULTITASK AND TRANSFER LEARNING FOR PREDICTING PROPERTIES WITH SCARCE DATA

CROSS-REFERENCE TO RELATED APPLICATION

This application claims the benefit of priority under 35 U.S.C. § 119 of U.S. Provisional Application Ser. No. 63/443,166 filed on Feb. 3, 2023, the content of which is relied upon and incorporated herein by reference in its entirety.

FIELD

Embodiments herein relate generally to improved approaches for predicting properties using multitask learning and/or transfer learning, such as for preparing materials, such as glass, with predicted properties.

BACKGROUND

In the past, building models based on scarce data has been done through various methods such as physical modeling and other machine learning approaches. Physical modeling requires substantial domain knowledge and in-depth understanding of the physics behind the data, which is very challenging, costly, and time consuming. Furthermore, physical models from physical modeling need to be customized and integrated with different domains for different properties, so there is less transferability between different properties. Where scarce amounts of data are available, traditional machine learning has very limited prediction power. At best, traditional machine learning approaches are only capable of generating models with very limited accuracy where limited data is available. Without accurate models, one is left with approximate models which often leads to excessive costs and long delays to market introduction for corresponding materials, products, processes, etc. that could otherwise be optimized using properties predicted by more accurate models.

BRIEF SUMMARY

Various embodiments described herein provide technological improvements in the field of machine learning. Models can be generated that have high accuracy even where scarce data is available to train the model. In some embodiments, models generated by approaches described herein may possess a higher accuracy than models generated by other machine learning approaches such as those using a multilayer perceptron (MLP) architecture.

Even with a significantly lower amount of training data, approaches described herein may outperform traditional machine learning algorithms such as MLP having more training data available. In some embodiments, approaches described herein may outperform other machine learning algorithms such as MLP approaches with as much as 95% less training data. The reduction of the data requirement is a significant improvement compared to other approaches in this field. It may significantly reduce the need for more data, specifically for expensive experimentations. With less data required, generating accurate models may be accomplished more easily, in less time, and in a cost-efficient manner. This results in a need for less processing power during model creation and usage, and improved efficiency in corresponding production of the downstream materials, products, processes, etc. that utilize the accurately predicted properties.

In this regard, models generated herein may be utilized to predict material properties. Building accurate models to predict materials properties is an important step toward functional materials design. The use of accurate models may shorten the path to automatic materials discovery and may allow for on the fly materials optimization during manufacturing. This may lead to significant increases in efficiency during the research and manufacturing processes for materials.

Models may be generated without any domain knowledge such as formulating equations, theories, feature engineering, etc. Approaches described herein may be used to create accurate models for a wide variety of settings, including materials, systems, and body design applications. The ability to generate models without any domain knowledge allows models to be generated more easily, in less time, and in a cost-efficient manner. Furthermore, the ability to generate models without any domain knowledge allows models to be successfully created even without input or oversight from experts or more experienced users. This requires less input into the models. Further, usage with overall less data (e.g., scarce data) creates a scenario where significantly less processing power is needed to prepare even more accurate models—providing significant improvements over current models and current model creation approaches.

Models may be utilized for various features. As an example, where models are used for glass composition design for a given application (e.g., damage resistance) one has to build many accurate models. For example, models may be formed for liquidus temperature, Young's modulus, bulk modulus, shear modulus, hardness, plane strain fracture toughness (KIC), Poisson's ratio, high temperature viscosity, annealing point, softening point, strain point, glass transition temperature, density, 200 Poise temperature, and/or 35 kPoise temperature. In such a case, KIC may be a property having limited data, with KIC being measured for only a small number of samples. Building an accurate model for KIC by itself may be difficult due to small amounts of data being available for this property. Other similar properties like Young's modulus, bulk modulus, shear modulus, hardness, and/or Poisson's ratio, for example, may have relatively greater amounts of data available, as these properties may be routinely measured for many samples. Notably, in some situations, such as described in examples herein, Poisson's ratio may have relatively less data than other properties, such as those listed above. Using various embodiments described herein, models may be trained collaboratively, and the properties for Young's modulus, bulk modulus, shear modulus, hardness, KIC, and Poisson's ratio may be trained using a common encoder. By using a common encoder, the resulting KIC model may be provided with greater accuracy.

Additionally, in some embodiments, the models for various properties having greater amounts of data available may possess a loss function that is tied to the accuracy of models for properties having lesser amounts of data. For example, where lesser amounts of data are available for the KIC property, the loss function for the models of other properties (e.g., Young's modulus, bulk modulus, etc.) may be a function of the accuracy of the model for KIC, and the loss function of the KIC model may not be tied to the accuracy of models for other properties.

Various embodiments herein, thus, aid in reducing delays associated with the design and execution of new experimentations— for example, in the aforementioned example, an accurate model may be provided to predict the KIC property without the need for additional KIC data to be obtained.

In an example embodiment, a method of forming a model for predicting one or more properties is provided. The method includes determining a plurality of datasets of properties. The method also includes training a common encoder and one or more individual decoders utilizing the plurality of datasets of properties. Each individual decoder of the individual decoder(s) is distinct from each other and is used to model different properties. The method also includes determining a transfer learning dataset for one or more properties, training a new decoder using the transfer learning dataset and the common encoder, generating a predicted property using the common encoder and the new decoder, and preparing an item using the predicted property.

In some embodiments, the item may be a material, and the properties may be material properties. In some embodiments, the common encoder may be a compositionally restricted attention-based network. In some embodiments, the individual decoder(s) may each be residual neural networks. In some embodiments, the common encoder and the individual decoder(s) may be trained simultaneously.

In some embodiments, the individual decoder(s) may include a first decoder, and the first decoder may be configured to generate a first model to predict a first predicted property. The new decoder may be configured to generate a second model to predict a second predicted property. More input data may be available for the first decoder than the new decoder, and the new decoder may be trained after the common encoder and the first decoder. Additionally, in some embodiments, at least one of the common encoder or the first decoder may be utilized in training the new decoder. Furthermore, in some embodiments, the common encoder and the first decoder may both be utilized in training the new decoder.

In some embodiments, the individual decoder(s) and the new decoder may each possess a first common characteristic. Additionally, in some embodiments, the individual decoder(s) and the new decoder may be utilized to develop models to determine material properties of a material.

In another example embodiment, a method of forming a model for predicting a property is provided. The method includes determining a plurality of datasets of properties. The method also includes training decoders and a common encoder utilizing the plurality of datasets of properties to generate models. Each decoder of the decoders is distinct from each other and is used to model different properties. The decoders include a first decoder and a second decoder. Each of the decoders is used to generate a respective model of the models, and the first decoder is configured to generate a first model and the second decoder is configured to generate a second model. The method also includes generating a predicted property using a model of the models and preparing an item using the predicted property. Limited data is available for the second decoder compared to the first decoder, and the first decoder is trained using a first loss function which considers the accuracy of both the first model and second model.

In some embodiments, the item may be a material, and the property may be a material property. Additionally, in some embodiments, the common encoder and the decoders may be trained simultaneously. Furthermore, in some embodiments, the common encoder may be trained before at least one decoder of the decoders, and parameters for the common encoder may be fixed before training the decoder(s). In some embodiments, the common encoder may be trained before the second decoder, and parameters for the common encoder may be fixed before training the second decoder. Also, in some embodiments, the common encoder and the first decoder may be trained simultaneously. Furthermore, in some embodiments, the common encoder may be utilized to train the second decoder. Additionally, the common encoder and the first decoder may be utilized to train the second decoder.

In some embodiments, the first decoder may be trained before the second decoder. In some embodiments, the common encoder may be a compositionally restricted attention-based network. Furthermore, in some embodiments, the decoders may each be residual neural networks.

In some embodiments, the second decoder may be trained using a second loss function that considers the accuracy of the second model. Additionally, in some embodiments, the second loss function may prioritize consideration of the accuracy of the second model.

In some embodiments, the first decoder may be capable of individually training an individually trained model using all available data so that the individually trained model has a greater accuracy than another individually trained model individually trained by the second decoder using all available data.

In another example embodiment, an item is provided that is produced by a process. The process includes determining a plurality of datasets of properties. The process also includes training a common encoder and one or more individual decoders utilizing the plurality of datasets of properties. Each individual decoder of the individual decoder(s) is distinct from each other and is used to model different properties. The process also includes determining a transfer learning dataset for one or more properties, training a new decoder using the transfer learning dataset and the common encoder, generating a predicted property of the item using the common encoder and the new decoder, and preparing the item using the predicted property.

BRIEF DESCRIPTION OF THE DRAWINGS

Reference will now be made to the accompanying drawings, which are not necessarily drawn to scale, and wherein.

DETAILED DESCRIPTION

Example embodiments now will be described more fully hereinafter with reference to the accompanying drawings, in which some, but not all embodiments are shown.

Figure 1:
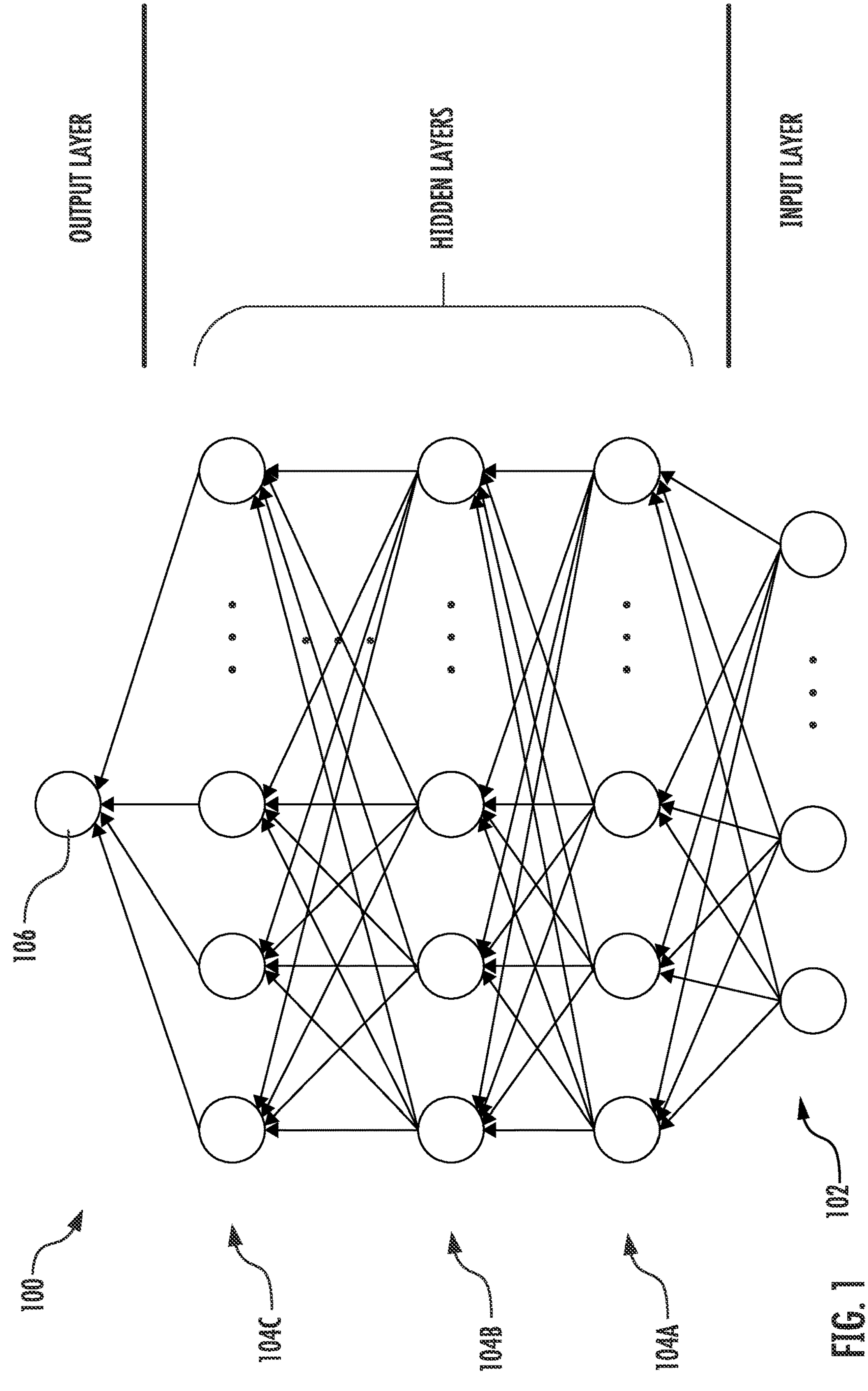
FIG. 1 is a schematic view illustrating an example MLP architecture, in accordance with some embodiments discussed herein.

In existing machine learning approaches, a large amount of data is required to develop an accurate model for a given property. Furthermore, even where models are developed using these machine learning approaches, the models tend to have a limited accuracy. FIG. 1 is a schematic view illustrating an example multilayer perceptron (MLP) architecture 100, which is an existing machine learning approach. In the MLP architecture 100, an input layer 102 is provided as well as hidden layers and an output layer 106. In the illustrated embodiment, the hidden layers include a first hidden layer 104A, a second hidden layer 104B, and a third hidden layer 104C. In the illustrated embodiment, the input layer 102 includes a plurality of neurons therein, each of the hidden layers include a plurality of neurons, and the output layer 106 includes a single neuron. The MLP architecture 100 is used to predict a single property in the output layer. Each of the neurons of the input layer 102 are connected to the neurons of the first hidden layer 104A, each of the neurons of the first hidden layer 104A are connected to each of the neurons of the second hidden layer 104B, each of the neurons of the second hidden layer 104B are connected to each of the neurons of the third hidden layer 104C, and each of the neurons of the third hidden layer 104C are connected to the neuron in the output layer 106. With the MLP architecture 100, a model is obtained by undergoing training with a large number of data points to optimize the weights for each of the respective neurons. An optimal architecture is searched for using Hyperparameter Bayesian Optimization.

Figure 2:
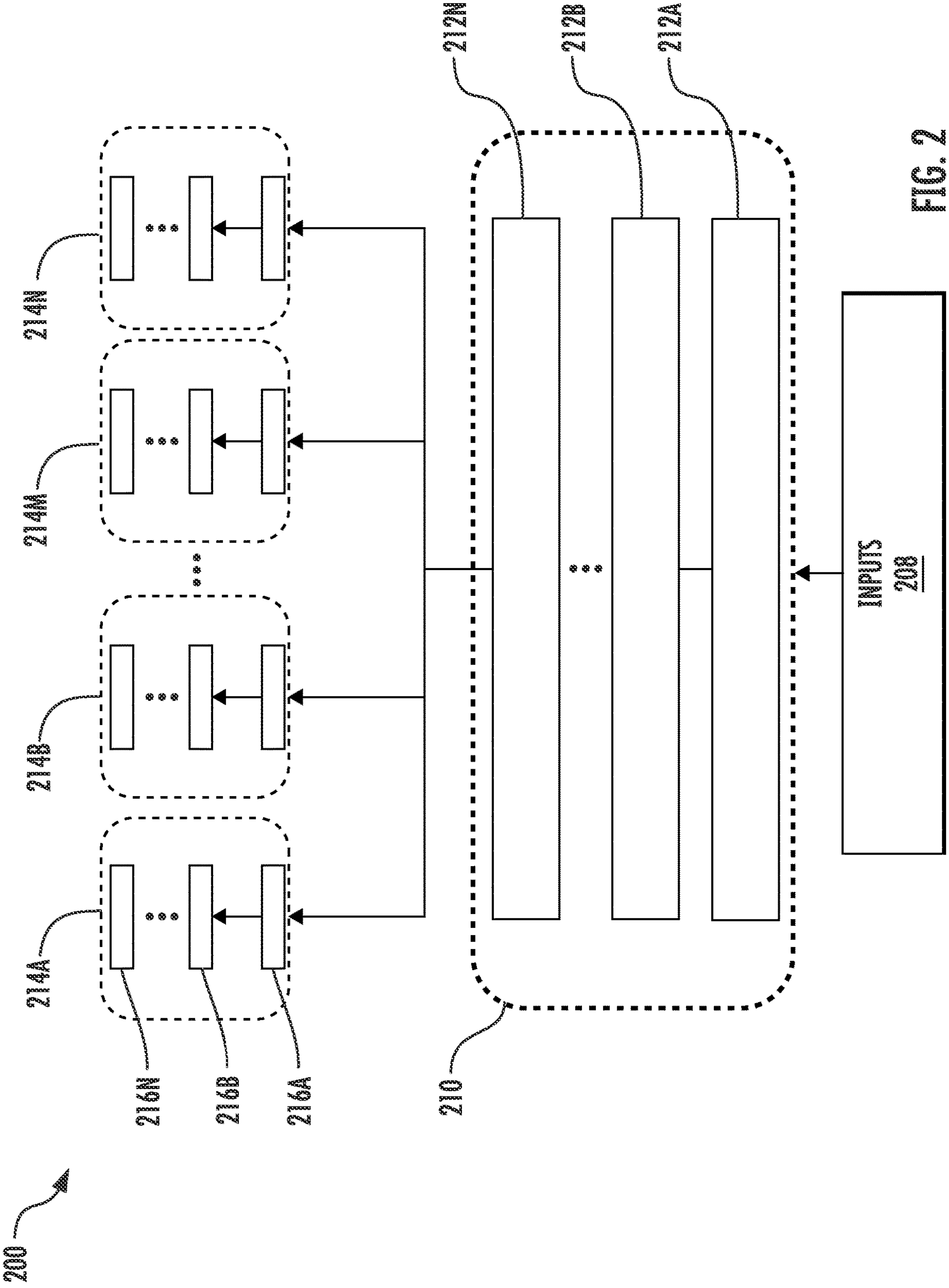
FIG. 2 is a schematic view illustrating an example architecture for multitask learning, in accordance with some embodiments discussed herein.

One approach that may be used by various embodiments to improve accuracy of models is multitask learning. Where multitask learning is applied, many models may be trained at the same time from multiple materials properties. FIG. 2 is a schematic view illustrating an example architecture 200 for multitask learning. An input layer 208 and a common encoder 210 are provided. The common encoder 210 may include a first data point 212A, a second data point 212B, and additional data points up to a final data point 212N. The common encoder 210 may be a compositionally restricted attention-based network (i.e., a "Crabnet").

A plurality of decoders are illustrated in FIG. 2. A first decoder 214A, a second decoder 214B are provided, and additional decoders are provided up to decoder 214M and a final decoder 214N. Each decoder may comprise a plurality of data points. For example, the first decoder 214A includes a first data point 216A, second data point 216B, and additional data points up to a final data point 216N. Each decoder shares the common encoder 210, but each decoder may be dedicated to training a single property. Each decoder of the one or more individual decoders may be distinct from each other and may be utilized to model different properties. For example, the first decoder 214A may be configured to generate a first model that may be used to predict a first property, the second decoder 214A may be configured to generate a second model that may be used to predict a second property, and so on. The individual decoders may each be residual neural networks (i.e., "Resnets"). The encoder and decoders may each be trained from scratch without requiring any domain knowledge such as formulating equations, theories, feature engineering, etc. The encoder and decoders may be trained using a weighted loss function. The decoders may each be trained using their own respective weighted loss function to generate a model for a property.

Once models have been developed by the decoders, an item may be prepared using the predicted properties generated by the models. For example, where the item is a material, the predicted properties may be material properties for the material, and the material may be prepared so that the material will possess the predicted properties. Where the item is a material, the decoders may generate models configured to generate predicted properties for the material such as the annealing point of the material, the thermal expansion of the material, the density of the material, the Poisson's ratio for the material, the shear modulus of the material, the softening point of the material, the strain point of the material, the stress optical coefficient of the material, the viscosity at liquidus of the material, and the Young's Modulus of the material. However, models may be generated to predict other properties of the material. The predicted properties may be the optimal properties for the item.

In some embodiments, the common encoder and the decoders may each be trained simultaneously. Training the common encoder and the decoders simultaneously may improve the accuracy of models generated by each decoder as compared to developing separate models for each property individually using an MLP architecture. For example, use of multi-task learning provides for improved accuracy because it leverages commonalities between similar data even for modeling different properties. In this regard, it is theorized that related properties (e.g., properties of a material) have correlations that are difficult to individually capture and the modeling share characteristics that aid each other in model forming due to their "proximity". Thus, multi-task learning attempts to leverage this theory and trains a common encoder for use with different decoders for forming models for different properties.

Testing was performed to evaluate the coefficient of determination (i.e., "R-squared value" or "R-squared") of models generated where common encoders and decoders were trained simultaneously to determine various material properties. Additionally, testing was performed to evaluate the R-squared value of models generated where models were trained individually using MLP architecture for each material property. The same amount of data points were utilized for both testing approaches. Results of the testing are summarized in Table 1 below.

TABLE 1

R-Squared Values for Models Generated Using Different Architectures

| Property | R-Squared Using MLP (Single Task) Validation | R-Squared Using Multitask Learning Approach |
|---|---|---|
| Annealing Point | 0.96 | 0.98 |
| Thermal Expansion | 0.97 | 0.98 |
| Density | 0.94 | 0.97 |
| Poisson's Ratio | 0.73 | 0.87 |
| Shear Modulus | 0.96 | 0.97 |
| Softening Point | 0.95 | 0.96 |
| Strain Point | 0.96 | 0.97 |
| Stress Optical Coefficient | 0.97 | 0.98 |
| Viscosity at Liquidus | 0.90 | 0.94 |
| Young's Modulus | 0.96 | 0.98 |

As illustrated, even with the same amount of data available, the multitask learning approach resulted in higher R-squared values for each property. For example, the R-squared value using an MLP architecture for the Poisson's Ratio was just 0.73, and the R-squared value using the multitask learning approach for the Poisson's Ratio was 0.87. For each property, the R-squared value obtained through the use of multitask learning exceeded the R-squared value obtained through the use of MLP architecture. Thus, the accuracy may be significantly improved without requiring an increase in the amount of available data.

Figure 3:
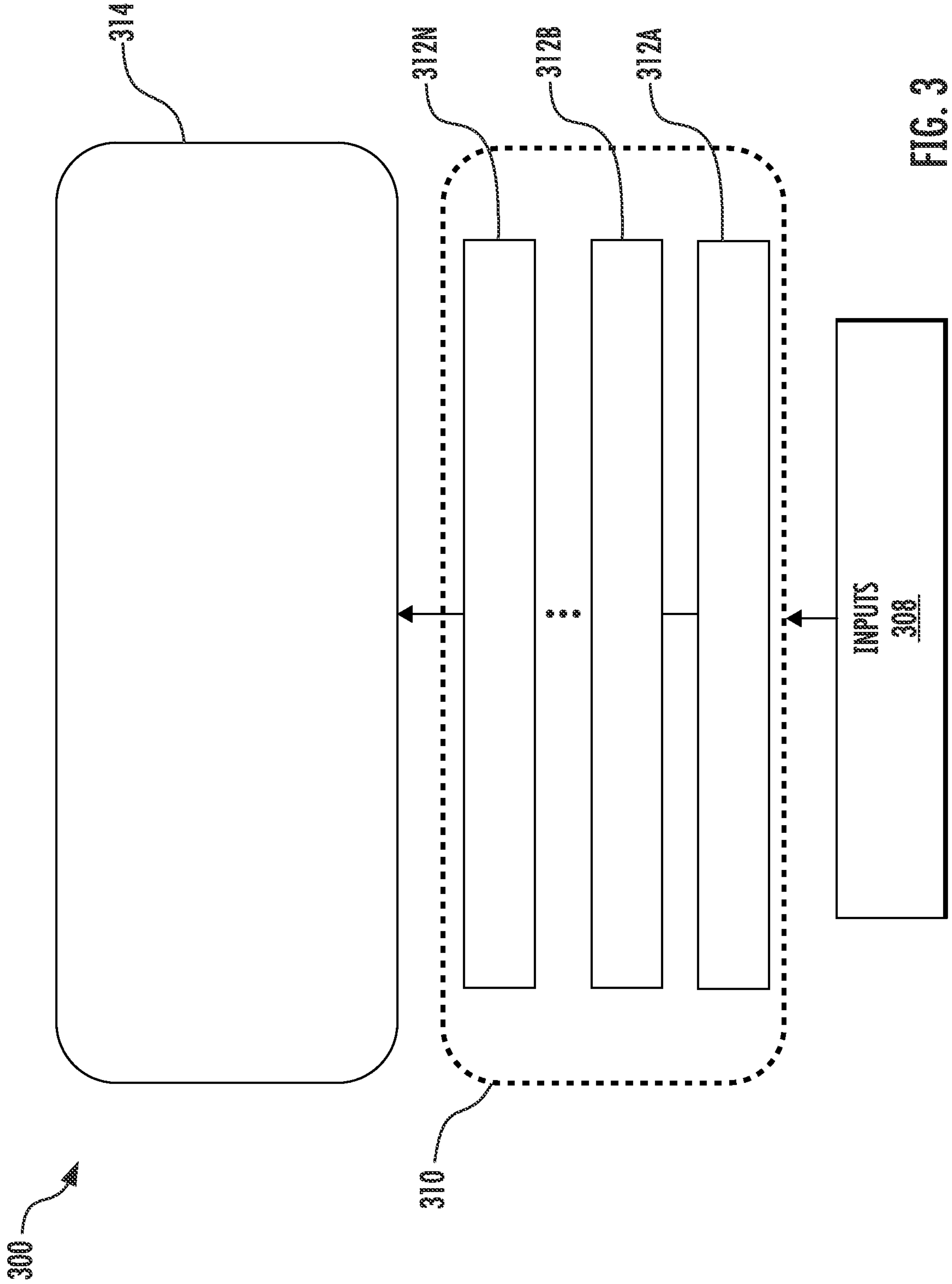
FIG. 3 is a schematic view illustrating an example architecture for static transfer learning, in accordance with some embodiments discussed herein.

Static transfer learning may also be used to generate an accurate model using a particular decoder where limited data is available related to the property being modeled. With static transfer learning, a pre-trained common encoder (e.g., from the multitask learning approach, such as described with respect to FIG. 2) may be used to train a new decoder having scarce data so that the new decoder may generate an accurate model. FIG. 3 is a schematic view illustrating an example architecture 300 for static transfer learning. As illustrated in FIG. 3, an input layer 308 and a common encoder 310 are provided. The common encoder 310 may include a first data point 312A, a second data point 312B, and additional data points up to a final data point 312N. The common encoder 310 may be a Crabnet.

In static transfer learning, the common encoder 310 is pretrained before being used to assist in training a new decoder 314. For example, the common encoder 310 may be trained with other decoders in the multitask learning architecture of FIG. 2, and the parameters of the common encoder 310 may be fixed before training the new decoder 314. Large amounts of data may be available in training the common encoder 310 and the other decoders. After training the common encoder 310 with the multitask validation model, the common encoder 310 may then "transferred" to be used to train the new decoder 314. In some embodiments, a transfer learning data set may be determined for the property being model (e.g., a data set that is available regarding the property), and the common encoder 210 and the transfer learning data set may be used to train a new decoder 314 (see FIG. 3). With the static learning approach, the new decoder 314 may be used to form an accurate model even where a scarce amount of data is available for the new decoder 314 or where the new decoder 314 is used to generate a model for a property that is difficult to determine with a high accuracy (e.g., Poisson's ratio).

The common encoder 310 may have previously been used alongside other decoders to train several models. The other decoders used to pretrain the common encoder 310 may share similarities with the new decoder, with each of the decoders sharing some characteristic. For example, each of the decoders may be used to develop models for different material properties for the same material. In one example, the common encoder 310 may be pretrained alongside several decoders used to predict, for example, an annealing point, a thermal expansion property, a density, a shear modulus, a softening point, a strain point, a stress optical coefficient, a viscosity at liquidus, and Young's modulus for a material. Once pretrained alongside these decoders, the common encoder 310 could be utilized to train a new decoder that is configured to generate a model to predict, for example, the Poisson's ratio for the same material (although other properties may be modeled in either the multitask learning architecture or the static transfer learning architecture).

Notably, a static transfer learning approach may generate models having high R-squared values even where only a limited amount of data is available. Testing was performed to evaluate the R-squared values obtained for the MLP approach and the static transfer learning approach where limited training data was used. Under both approaches, models were developed to predict the annealing point for materials. Under the static transfer learning approach, a pretrained encoder is provided with a new decoder having limited data. Table 2 below summarizes the results.

TABLE 2

R-Squared Values for Models Generated by Different Architectures Using Limited Training Data

| Percentage of Available Data Used for Training | Percentage of Available Data Used for Testing | R-Squared for MLP Approach | R-Squared for Static Transfer Learning Approach |
|---|---|---|---|
| 1% | 99% | 0.02 | 0.93 |
| 2% | 98% | 0.74 | 0.93 |
| 5% | 95% | 0.85 | 0.93 |
| 10% | 90% | 0.87 | 0.95 |
| 12% | 88% | 0.87 | 0.95 |
| 15% | 85% | 0.89 | 0.96 |
| 18% | 82% | 0.91 | 0.96 |
| 20% | 80% | 0.93 | 0.96 |

As shown above, the left-hand column shows the percentage of data that was used to develop the model, and the next column shows the percentage of data that was used to test the developed model. A total of 1,764 data points were available for training and testing. Where seventeen data points were used for training (approximately one percent of the available data), the R-squared value for the MLP approach was just 0.02, so no meaningful predictions could be made from the developed model. However, where only seventeen data points were used for training using the static transfer learning approach, the R-squared value was 0.93. The MLP approach could not obtain an R-squared value of 0.93 until twenty percent of the available data was used for training or until approximately 352 data points were used. Thus, the static transfer learning approach was able to accomplish an R-squared value of 0.93 with twenty times less testing data than the MLP approach.

Furthermore, where only two percent of available data was used for training, the R-squared value for the MLP approach was just 0.74 and the R-squared value for the static transfer learning approach was 0.93. Where only five percent of available data was used for training, the R-squared value for the MLP approach was just 0.85 and the R-squared value for the static transfer learning approach was 0.93. Even where additional data was used for training, the R-squared value for the static transfer learning approach exceeded the R-squared value for the MLP approach at all times.

The static transfer learning approach may improve the R-squared regardless of the available data used in testing, but the static transfer learning approach may be particularly beneficial to use where properties are difficult to measure or where a limited amount of data is available. For example, Poisson's ratio is relatively difficult to determine, and it may be difficult and time consuming to obtain sufficient data to improve the R-squared value for a model used to predict Poisson's ratio to a desired level where MLP learning is used. However, using static transfer learning permits an accurate model having a desirable R-squared value to be obtained using limited data for even difficult-to-determine properties.

The common encoder and some or all of the decoders may be trained at different times in other embodiments. For example, the common encoder may be trained before some or all of the decoders. Furthermore, a first decoder may be trained before a second, new decoder. Where the common encoder and a first decoder are trained before a second, new decoder, the common encoder and/or the first decoder may be utilized in training the new decoder— doing so may be beneficial where less input data is available that is relevant to the second decoder.

Figure 4:
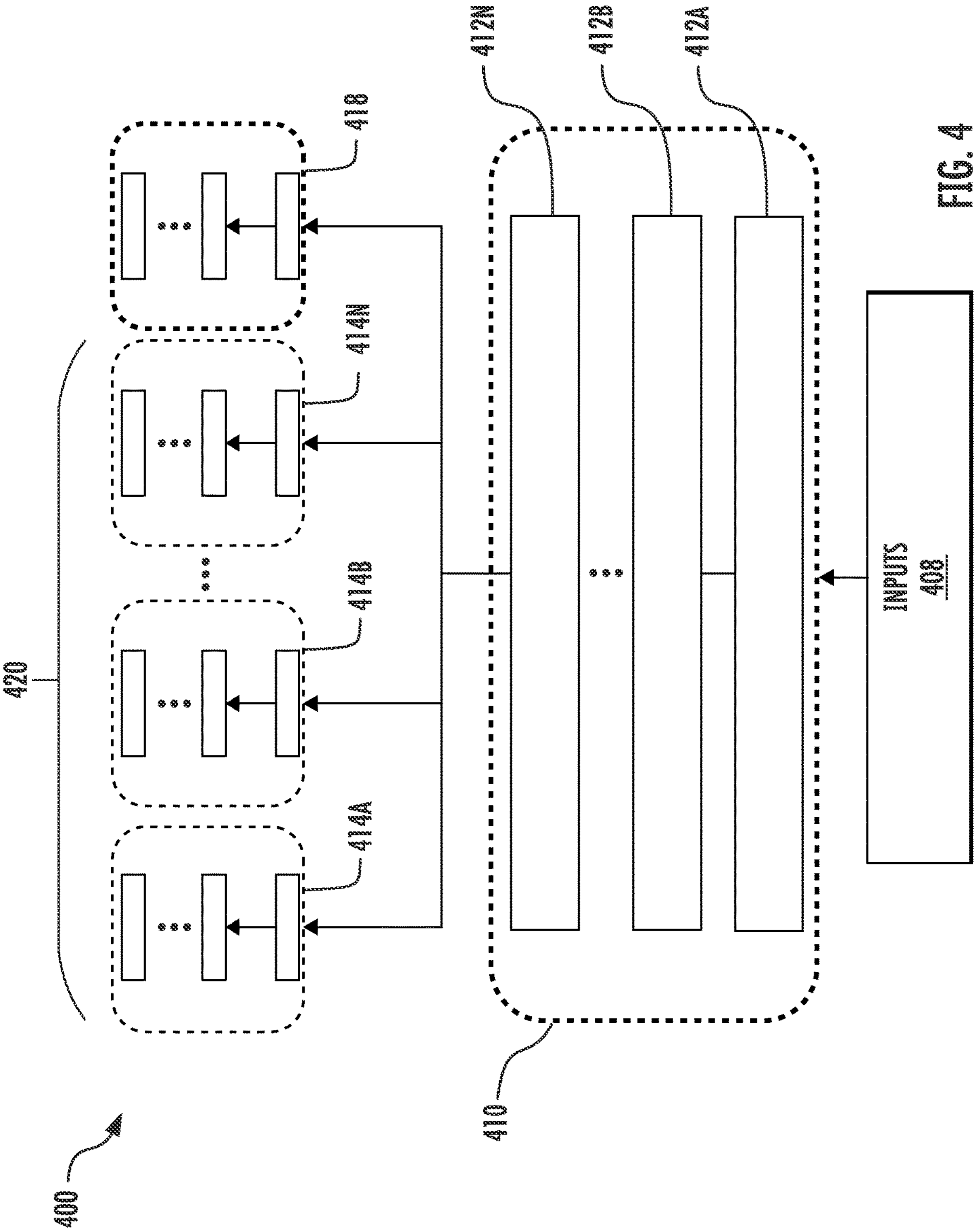
FIG. 4 is a schematic view illustrating an example architecture for dynamic transfer learning, in accordance with some embodiments discussed herein.

Another approach that may be used is dynamic transfer learning, which is another approach that may allow decoders to generate accurate models even where very small datasets are available. FIG. 4 is a schematic view illustrating an example architecture for dynamic transfer learning. As illustrated in FIG. 4, an input layer 408 and a common encoder 410 are provided. The common encoder 410 may include a first data point 412A, a second data point 412B, and additional data points up to a final data point 412N. The common encoder 410 may be a Crabnet.

A plurality of decoders are illustrated in FIG. 4. A first decoder 414A, a second decoder 414B, and additional decoders up to a final decoder 414N are provided in a first set of decoders 420. Another decoder 418 is also provided. Each decoder may comprise a plurality of data points. Each decoder shares the common encoder 410, but each decoder may be dedicated to training a single property. Each decoder of the one or more individual decoders may be distinct from each other and may be utilized to model different properties. For example, the first decoder 414A may be configured to generate a first model that may be used to predict a first property, the second decoder 414A may be configured to generate a second model that may be used to predict a second property, and so on. The individual decoders may each be residual neural networks (i.e., "Resnets"). The encoder and decoders may each be trained from scratch without requiring any domain knowledge such as formulating equations, theories, feature engineering, etc. In some embodiments, the encoder 410 and decoders may be trained using a weighted loss function. The decoders may each be trained using their own respective weighted loss function to generate a model for a property.

Where dynamic transfer learning is used, at least one decoder in the first set of decoders 420 is trained using a loss function which considers the accuracy of the model generated by the decoder 418. This may be beneficial where the decoder 418 has limited data or where the decoder 418 is being used to train a model to predict a difficult-to-determine property (e.g., Poisson's ratio). In some embodiments where dynamic transfer learning is used, each of the decoders in the first set of decoders 420 may be trained using a loss function that considers the accuracy of the model generated by the decoder 418. The decoder 418 may be trained using a loss function that only considers or otherwise prioritizes the accuracy of the model generated by the decoder 418. For example, the common encoder 410 and each of the decoders 420 may not be completely formed until the other decoder 418 achieves a desired accuracy, even if that means that the accuracy of one or more of the decoders 420 suffers. For example, the dynamic transfer learning approach may "drive" an R-Squared value of 0.93 for the accuracy of predicting the property of the model corresponding to decoder 418. That driving may occur with or without a bounding on one or more of the decoders 420 (e.g., one or more of the decoders 420 may also have a bounding regarding an allowed R-Squared value).

In some embodiments, multitask learning, dynamic transfer learning, and static transfer learning may be used simultaneously. For example, where dynamic transfer learning is utilized, the first set of decoders 420 and the decoder 418 may be trained simultaneously in a manner similar to multitask learning (see, e.g., FIG. 2). In other embodiments, dynamic transfer learning and static transfer learning may be used together. For example, looking at FIG. 4 as an example, the first group of decoders 420 and the common encoder 410 may be trained simultaneously, and the parameters of the common encoder 410 may be fixed after this initial training while parameters for the first group of decoders 420 may remain unfixed. The first group of decoders 420 may then be trained again alongside the decoder 418, with the weighted loss functions used by the first group of decoders 420 being tied to the accuracy of the model generated by the decoder 418.

Figure 5:
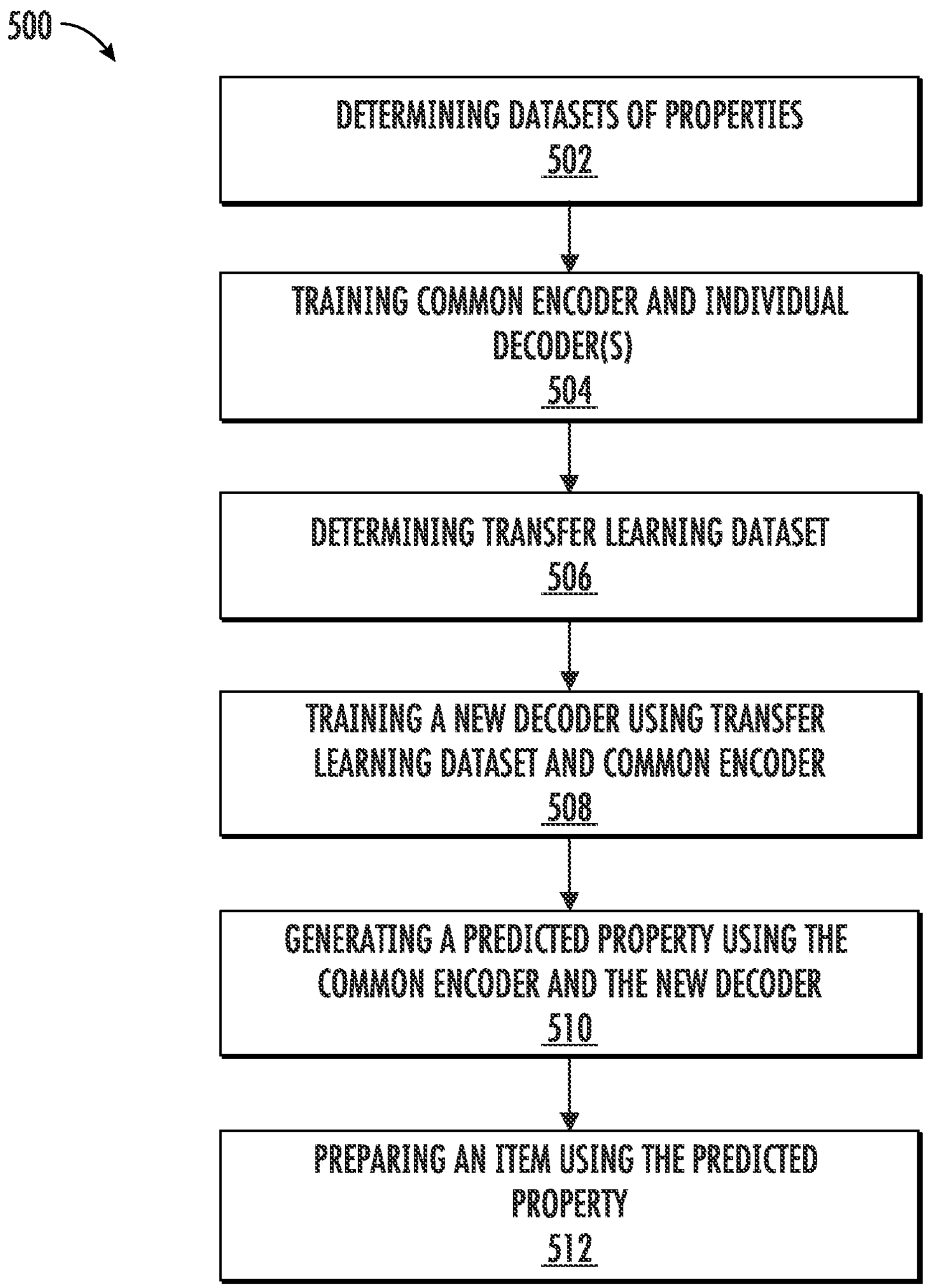
FIGS. 5-9 are flowcharts illustrating example methods for forming a model for predicting properties, in accordance with some embodiments discussed hercin.

Various methods are also contemplated for forming one or more models for predicting properties, and FIG. 5 illustrates one such example method. FIG. 5 is a flowchart illustrating an example method 500 for forming a model for predicting properties. The method 500 may predict properties with an improved accuracy as compared to other approaches using an MLP architecture.

At operation 502, a plurality of datasets of properties are determined. In some embodiments, the properties are material properties, but other datasets of properties may be determined instead of or in addition to material properties.

At operation 504, a common encoder and one or more individual decoders are trained. The common encoder and the one or more individual decoders are trained utilizing the plurality of datasets of properties. Each individual decoder is distinct from other decoders, and the decoders are each used to model different properties. In some embodiments, the properties may be material properties. The common encoder may be a compositionally restricted attention-based network. The decoders may be residual neural networks in some embodiments.

A transfer learning dataset is determined for one or more properties at operation 506. At operation 508, a new decoder is trained using the transfer learning dataset. In some embodiments, the parameters for the common encoder and/or some or all of the individual decoders may be fixed before training the new decoder. In other embodiments, the parameters for some or all of the individual decoders may not be fixed before training the new decoder, and the individual decoders may be retrained alongside the new decoder so that the models created by the individual decoders are tuned—where this is the case, some or all of the individual decoders may be trained with a loss function that considers the accuracy of the model generated by the new decoder.

The new decoder may be configured to develop a new model, and the new decoder may be trained using a loss function that considers the accuracy of the new model. In some embodiments, the new decoder may be trained using a loss function that only considers or otherwise prioritizes the accuracy of the new model.

At operation 510, a predicted property is generated using the common encoder and the new decoder. The predicted property may be a material property in some embodiments. Additionally, at operation 512, an item is prepared using the predicted property. In some embodiments, the item is a material, such as glass.

Figure 6:
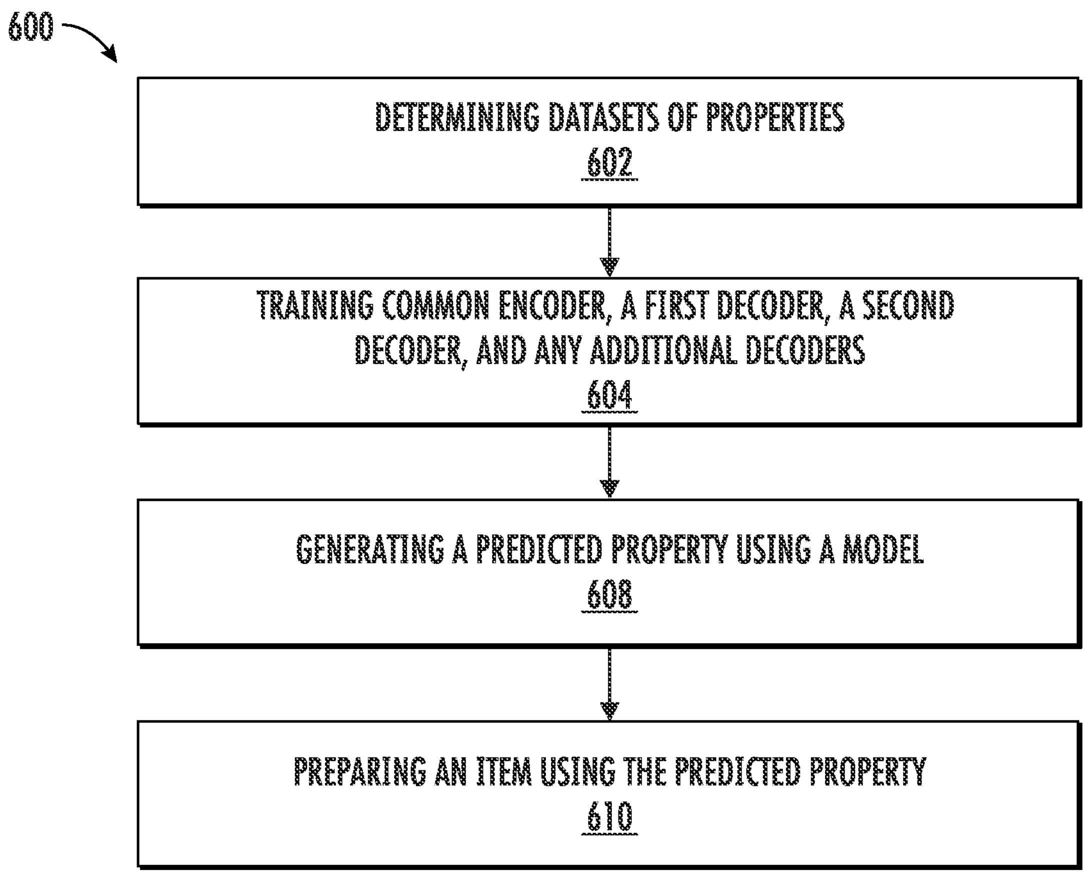

In some embodiments, multitask learning may be used to provide improved accuracy over approaches using MLP architectures. FIG. 6 is a flowchart illustrating an example method 600 for forming a model for predicting properties using multitask learning. In FIG. 6, the common encoder and decoders are trained simultaneously.

At operation 602, a plurality of datasets of properties are determined. In some embodiments, the properties are material properties, but other datasets of properties may be determined instead of or in addition to material properties.

At operation 604, a common encoder, a first decoder, a second decoder, and additional decoders (if any) are trained. The common encoder and each of the decoders are trained simultaneously, but one or more decoders may be trained at later times in other embodiments. The common encoder and the decoders are trained utilizing the plurality of datasets of properties. The decoders may each be configured to generate a model, with the first decoder being configured to generate a first model and the second decoder being configured to generate a second model. In some embodiments, the common encoder may be a compositionally restricted attention-based network, and the decoders may be residual neural networks in some embodiments.

At operation 608, a predicted property is generated using a model. This model may be the first model produced by the first decoder, the second model produced by the second decoder, or another model. The predicted property may be a material property in some embodiments. An item is prepared using the predicted property at operation 610. In some embodiments, the item is a material, such as glass.

In some embodiments, limited data may be available for the second decoder compared to the first decoder. In some such situations, in some embodiments, the first decoder may be trained using a first loss function which considers the accuracy of both the first model generated by the first decoder and the second model generated by the second decoder. The second decoder may be configured to develop a second model, and the second decoder may be trained using a loss function that considers the accuracy of the second model. In some embodiments, the second decoder may be trained using a loss function that only considers or otherwise prioritizes the accuracy of the second model.

In some scenarios, the first decoder may be capable of individually training a first model using all available data so that the first model has a greater accuracy than a second model individually trained using all available data— this situation may arise where the first model is used to predict a property that is relatively simple to determine, such as thermal expansion properties for a material, and where the second model is used to predict a property that is difficult to determine, such as a Poisson ratio for a material. In some such situations, the first decoder may be trained using a first loss function which considers the accuracy of both the first model generated by the first decoder and the second model generated by the second decoder. The second decoder may be configured to develop a second model, and the second decoder may be trained using a loss function that considers the accuracy of the second model. In some embodiments, the second decoder may be trained using a loss function that only considers or otherwise prioritizes the accuracy of the second model.

Figure 7:
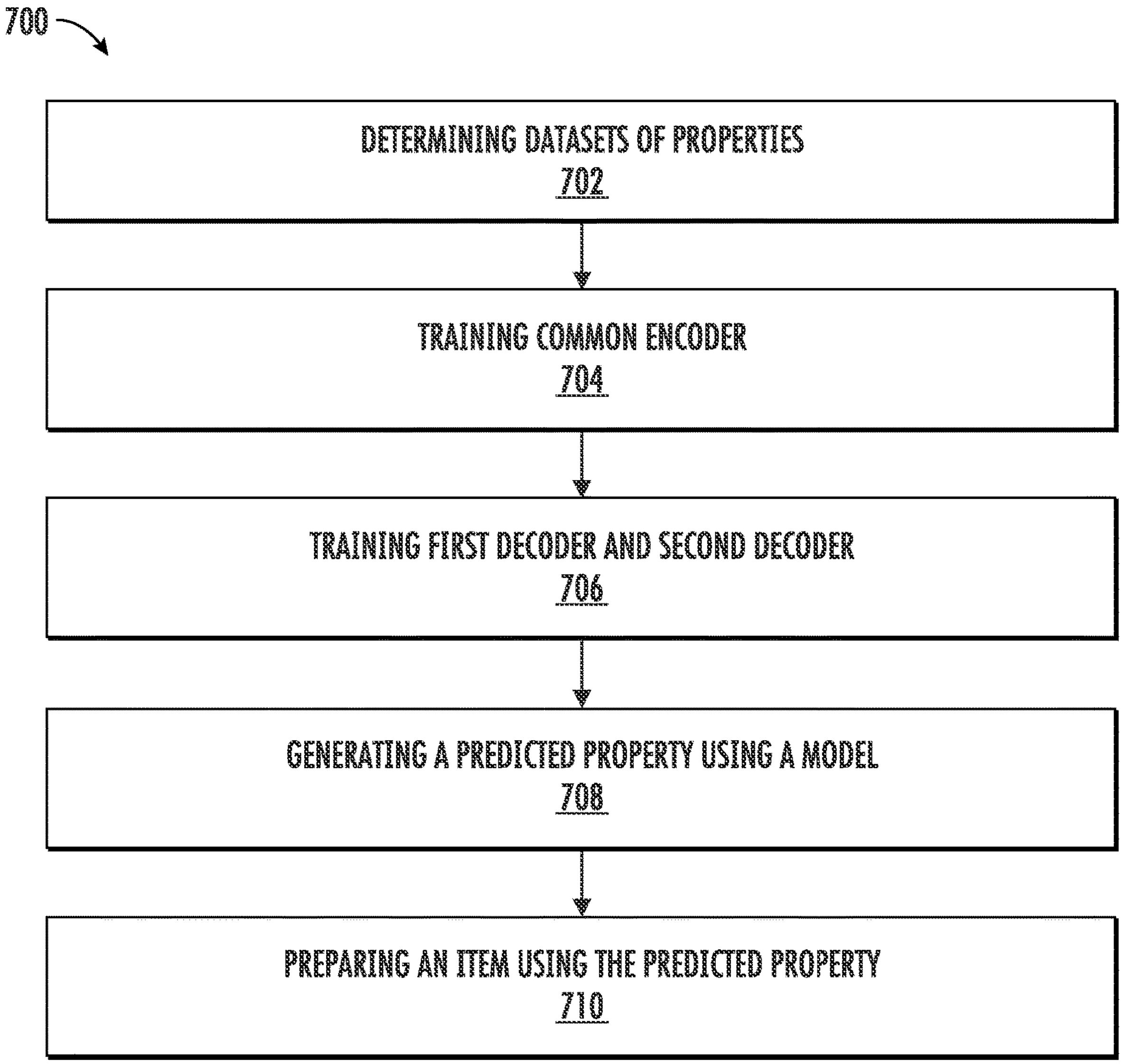

FIG. 7 is a flowchart illustrating an example method 700 for forming a model for predicting properties. The method 700 may predict properties with an improved accuracy as compared to other approaches using an MLP architecture.

At operation 702, a plurality of datasets of properties are determined. In some embodiments, the properties are material properties, but other datasets of properties may be determined instead of or in addition to material properties.

At operation 704, a common encoder is trained. The common encoder is trained utilizing the plurality of datasets of properties. The common encoder may be trained before the first decoder and the second decoder. Parameters for the common encoder may be fixed before training the first decoder and the second decoder. In some embodiments, the common encoder may be a compositionally restricted attention-based network. The decoders may be residual neural networks in some embodiments.

At operation 706, a first decoder and a second decoder are trained. The first decoder and the second decoder are trained utilizing the plurality of datasets of properties. Each decoder of the decoders is distinct from other decoders, and each decoder is used to model a different property The first decoder and the second decoder may be trained simultaneously, and these decoders may be trained after the common encoder (although they may be trained simultaneously with the common encoder in some embodiments). The decoders may each be configured to generate a model, with the first decoder being configured to generate a first model and the second decoder being configured to generate a second model. The first decoder may simultaneously be refined alongside the second decoder, with the first decoder being trained using a loss function that is tied to the accuracy of the model generated by the second decoder and with the second decoder being trained using a loss function that only considers or otherwise prioritizes the accuracy of the model generated by the second decoder.

At operation 708, a predicted property is generated using a model. The predicted property may be a material property in some embodiments. This model may be the first model produced by the first decoder, the second model produced by the second decoder, or another model. At operation 710, an item is prepared using the predicted property. In some embodiments, the item is a material, such as glass.

Figure 8:
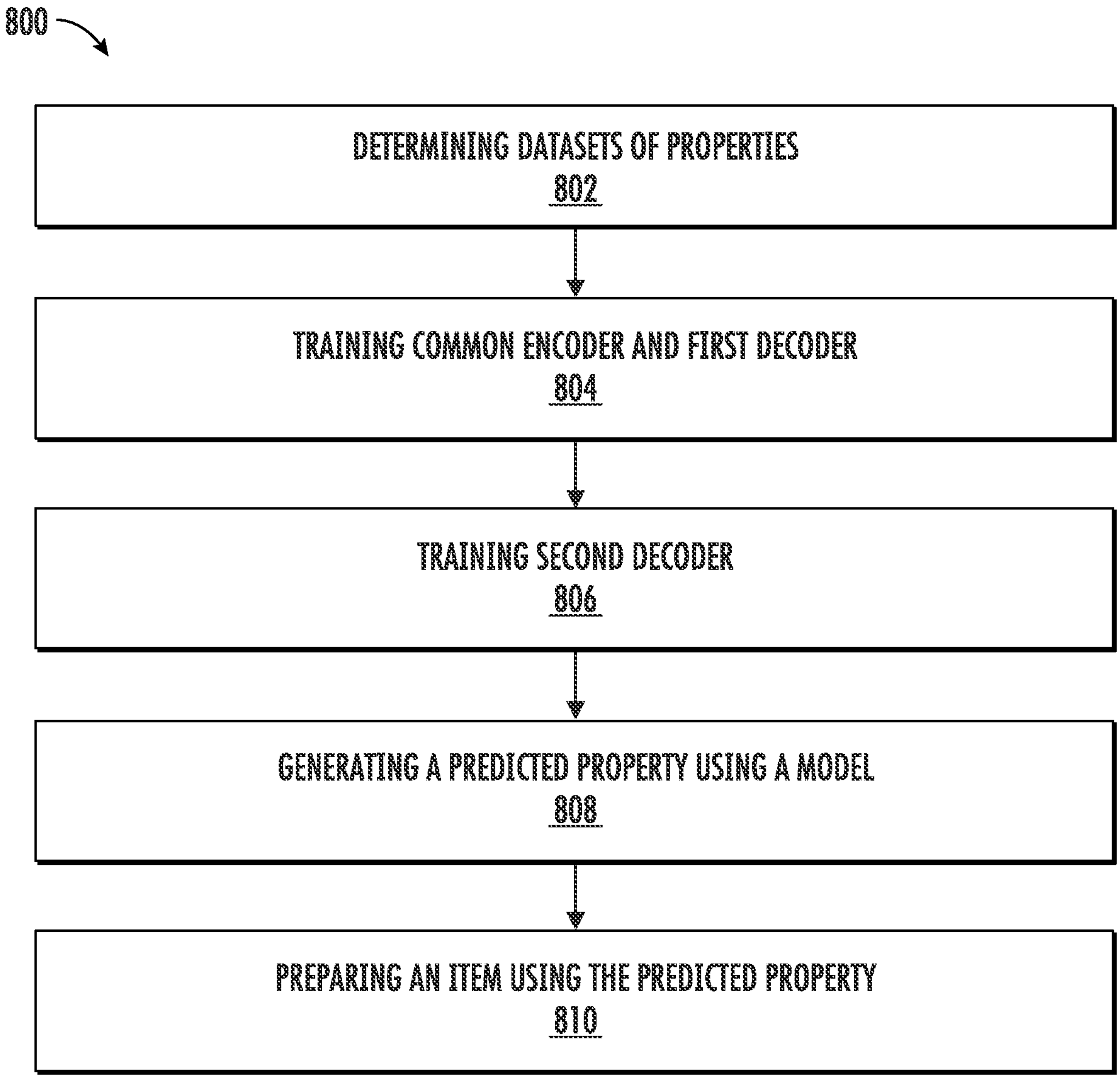

In some embodiments, such as those where static transfer learning is used, decoders may be trained at different times. FIG. 8 is a flowchart illustrating an example of one method 800 for forming a model for predicting properties where decoders are trained at different times. The method 800 may predict properties with an improved accuracy as compared to other approaches using an MLP architecture.

At operation 802, a plurality of datasets of properties are determined. In some embodiments, the properties are material properties, but other datasets of properties may be determined instead of or in addition to material properties.

At operation 804, a common encoder and a first decoder are trained. The common encoder and the first decoder are trained utilizing the plurality of datasets of properties. The common encoder and the first decoder may be trained simultaneously, and the common encoder and the first decoder may both be trained before the second decoder. The decoders may each be configured to generate a model, with the first decoder being configured to generate a first model and the second decoder being configured to generate a second model. Parameters for the common encoder and the first decoder may be fixed before training the second decoder. However, parameters for only the common encoder may be fixed in some embodiments before training the second decoder.

At operation 806, a second decoder is trained. The second decoder is trained utilizing the plurality of datasets of properties. Each decoder of the decoders is distinct from other decoders, and each decoder is used to model a different property. The second decoder may be trained after the first decoder and the common encoder. The common encoder and/or the first decoder may be utilized to train the second decoder. The second decoder may be configured to develop a second model, and the second decoder may be trained using a loss function that considers the accuracy of the second model. In some embodiments, the second decoder may be trained using a loss function that only considers or otherwise prioritizes the accuracy of the second model. During the training of the second decoder in some embodiments, the first decoder may simultaneously be refined alongside the second decoder with the first decoder having a loss function that is tied to the accuracy of the model generated by the second decoder.

At operation 808, a predicted property is generated using a model. This model may be the first model produced by the first decoder, the second model produced by the second decoder, or another model. The predicted property may be a material property in some embodiments. At operation 810, an item is prepared using the predicted property. In some embodiments, the item is a material, such as glass.

The second decoder may be configured to develop a second model, and the second decoder may be trained using a loss function that considers the accuracy of the second model. In some embodiments, the second decoder may be trained using a loss function that only considers or otherwise prioritizes the accuracy of the second model.

Figure 9:
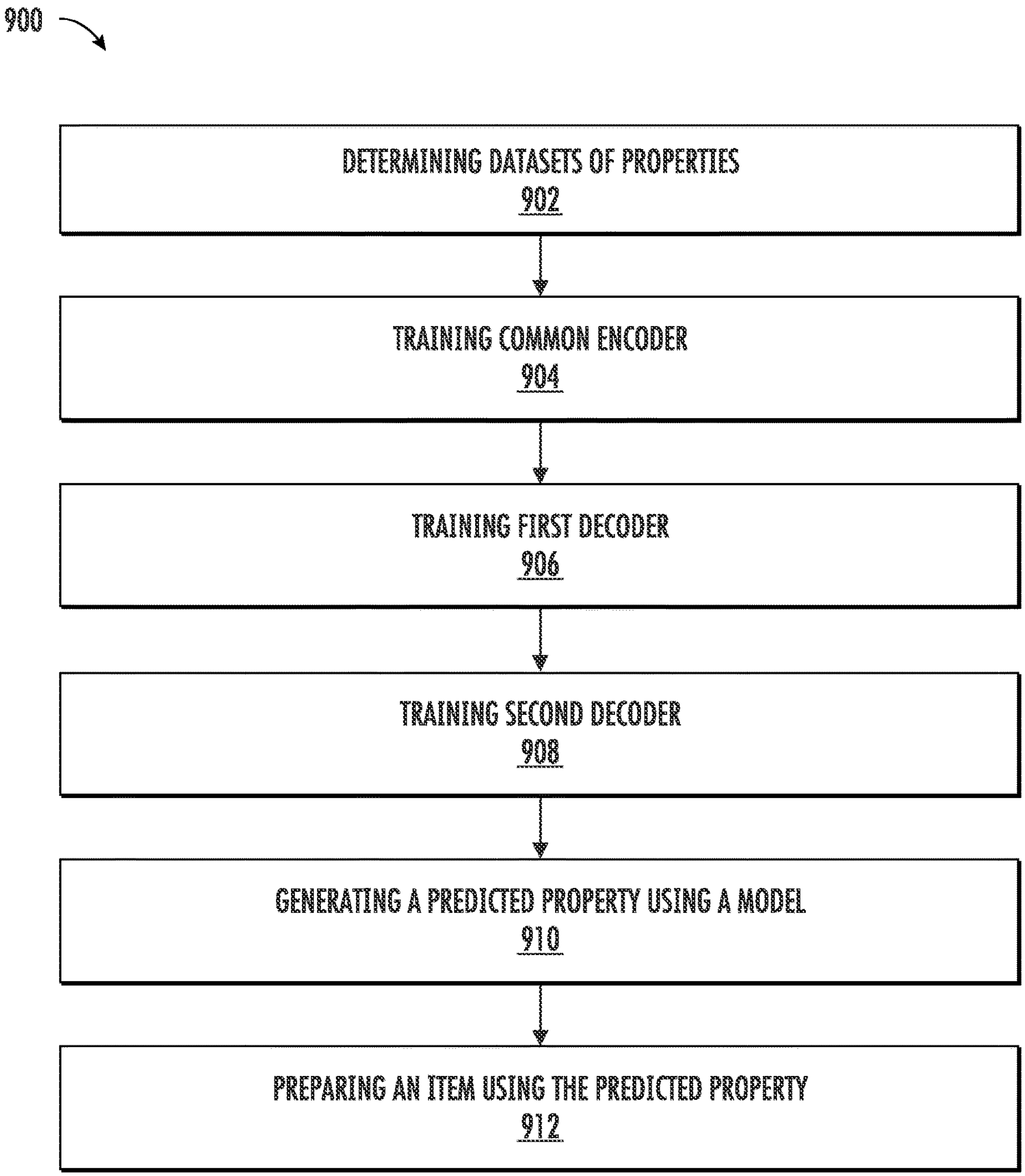

In some embodiments, the different decoders may be trained at different times. FIG. 9 is another flowchart illustrating an example method 900 for forming a model for predicting properties where different decoders are trained at different times. The method 900 may predict properties with an improved accuracy as compared to other approaches using an MLP architecture.

At operation 902, a plurality of datasets of properties are determined. In some embodiments, the properties are material properties, but other datasets of properties may be determined instead of or in addition to material properties.

At operation 904, a common encoder is trained. The common encoder is trained utilizing the plurality of datasets of properties. The common encoder may be trained before a first decoder and a second decoder. Parameters for the common encoder may be fixed before training the first decoder and the second decoder. In some embodiments, the common encoder may be a compositionally restricted attention-based network. The decoders may be residual neural networks in some embodiments.

At operation 906, a first decoder is trained. The first decoder is trained utilizing the plurality of datasets of properties. The decoders may each be configured to generate a model, with the first decoder being configured to generate a first model and the second decoder being configured to generate a second model. The first decoder may be trained after the common encoder but before the second decoder. Parameters for the first decoder may be fixed before training the second decoder. The common encoder may be utilized to train the first decoder.

At operation 908, a second decoder is trained. The second decoder is trained utilizing the plurality of datasets of properties. The second decoder may be trained after the first decoder and the common encoder. The common encoder and/or the first decoder may be utilized to train the second decoder.

At operation 910, a predicted property is generated using a model. This model may be the first model produced by the first decoder, the second model produced by the second decoder, or another model. The predicted property may be a material property in some embodiments.

At operation 912, an item is prepared or made using the predicted property. In some embodiments, the item is a material, such as glass.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A method of forming a model for predicting one or more properties of an item, the method comprising:

determining a plurality of datasets of properties, wherein the item is a material, and wherein the properties are material properties;

training a common encoder and one or more individual decoders utilizing the plurality of datasets of properties, wherein each individual decoder of the one or more individual decoders is distinct from each other and is configured to model different properties, wherein the common encoder is a compositionally restricted attention-based network, wherein the one or more individual decoders includes a first decoder, wherein the first decoder is configured to generate a first model to predict a first predicted property;

determining a transfer learning dataset for one or more properties;

training a new decoder using the transfer learning dataset and the common encoder, wherein the new decoder is configured to generate a second model to predict a second predicted property, wherein more input data is available for the first decoder than the new decoder, wherein the new decoder is trained after the common encoder and the first decoder, and wherein the new decoder is trained using a loss function that considers the accuracy of the second model;

generating a predicted property using the common encoder and the new decoder; and making the item using the predicted property.

2. The method of claim 1, wherein the common encoder and the one or more individual decoders are trained simultaneously.

3. The method of claim 1, wherein at least one of the common encoder or the first decoder is utilized in training the new decoder.

4. The method of claim 3, wherein the common encoder and the first decoder are both utilized in training the new decoder.

5. The method of claim 1, wherein the one or more individual decoders and the new decoder each possess a first common characteristic.

6. The method of claim 5, wherein the one or more individual decoders and the new decoder are utilized to develop models to determine material properties of a material.

7. The method of claim 1, wherein the one or more individual decoders are each residual neural networks.

8. A method of forming a model for predicting a property of an item, the method comprising:

determining a plurality of datasets of properties, wherein the item is a material, and wherein the properties are material properties;

training decoders and a common encoder utilizing the plurality of datasets of properties to generate models, wherein each decoder of the decoders is distinct from each other and is configured to model different properties, wherein the decoders include a first decoder and a second decoder, wherein each of the decoders is used to generate a respective model of the models, wherein the first decoder is configured to generate a first model and the second decoder is configured to generate a second model, wherein the common encoder is a compositionally restricted attention-based network, and, wherein the second decoder is trained using a loss function that considers the accuracy of the second model;

generating a predicted property using a model of the models; and making the item using the predicted property, wherein limited data is available for the second decoder compared to the first decoder, and wherein the first decoder is trained using a first loss function which considers the accuracy of both the first model and second model.

9. The method of claim 8, wherein the common encoder and the decoders are trained simultaneously.

10. The method of claim 8, wherein the common encoder is trained before at least one decoder of the decoders, and wherein parameters for the common encoder are fixed before training the at least one decoder.

11. The method of claim 8, wherein the common encoder is trained before the second decoder, and wherein parameters for the common encoder are fixed before training the second decoder.

12. The method of claim 11, wherein the common encoder and the first decoder are trained simultaneously.

13. The method of claim 12, wherein the common encoder is utilized to train the second decoder.

14. The method of claim 13, wherein the common encoder and the first decoder are utilized to train the second decoder.

15. The method of claim 8, wherein the first decoder is trained before the second decoder.

16. The method of claim 8, wherein the decoders are each residual neural networks.

17. The method of claim 8, wherein the second decoder is trained using a second loss function that considers the accuracy of the second model.

18. The method of claim 17, wherein the second loss function prioritizes consideration of the accuracy of the second model.

19. The method of claim 8, wherein the first decoder is capable of individually training an individually trained model using all available data so that the individually trained model has a greater accuracy than another individually trained model individually trained by the second decoder using all available data.

20. An item produced by a process comprising:

determining a plurality of datasets of properties, wherein the item is a material, and wherein the properties are material properties;

training a common encoder and one or more individual decoders utilizing the plurality of datasets of properties, wherein each individual decoder of the one or more individual decoders is distinct from each other and is configured to model different properties, wherein the common encoder is a compositionally restricted attention-based network, wherein the one or more individual decoders includes a first decoder, wherein the first decoder is configured to generate a first model to predict a first predicted property;

determining a transfer learning dataset for one or more properties;

training a new decoder using the transfer learning dataset and the common encoder, wherein the new decoder is configured to generate a second model to predict a second predicted property, wherein more input data is available for the first decoder than the new decoder, wherein the new decoder is trained after the common encoder and the first decoder, and wherein the new decoder is trained using a loss function that considers the accuracy of the second model;

generating a predicted property of the item using the common encoder and the new decoder; and making the item using the predicted property.

* * * * *